US007542420B1

(12) United States Patent
Mokhtar et al.

(10) Patent No.: US 7,542,420 B1
(45) Date of Patent: Jun. 2, 2009

(54) SYSTEMS, DEVICES, AND METHODS UTILIZING PORT DIMENSIONING STRATEGIES

(75) Inventors: Ahmed G. Mokhtar, Austin, TX (US); Lotfi M. Benmohamed, Clarksville, MD (US)

(73) Assignee: Broadwing Corporation, Columbia, MD (US)

( * ) Notice: Subject to any disclaimer, the term of this patent is extended or adjusted under 35 U.S.C. 154(b) by 805 days.

(21) Appl. No.: 10/933,549

(22) Filed: Sep. 3, 2004

Related U.S. Application Data

(60) Provisional application No. 60/500,027, filed on Sep. 4, 2003.

(51) Int. Cl.
*H04L 12/26* (2006.01)
(52) U.S. Cl. ...................... 370/235; 370/252
(58) Field of Classification Search ......... 370/229–235, 370/254–258
See application file for complete search history.

(56) References Cited

U.S. PATENT DOCUMENTS

| | | | | |
|---|---|---|---|---|
| 5,920,571 | A * | 7/1999 | Houck et al. ............... | 370/458 |
| 6,118,566 | A | 9/2000 | Price | |
| 6,344,922 | B1 | 2/2002 | Grubb et al. | |
| 6,449,073 | B1 | 9/2002 | Huber | |
| 6,747,953 | B1 * | 6/2004 | Qureshi et al. ............. | 370/235 |
| 6,836,467 | B2 * | 12/2004 | Stanley ..................... | 370/254 |
| 6,839,522 | B2 | 1/2005 | Grubb et al. | |

FOREIGN PATENT DOCUMENTS

WO  WO 01/15368   3/2001
WO  WO 01/54425   7/2001

OTHER PUBLICATIONS

Mokhtar Ahmed, "OXC Port Dimensioning Strategies in Optical Networks—A Nodal Perspective"; IEEE Communications Letters, vol. 8, No. 5, May 2004, pp. 283-285.*
Stanley, R.A.; "Cost-effective allocation of radioports under constant offered load"; Personal Wireless Communication, 1999. IEEE International Conference on Feb. 17-19, 1999; pp. 316-320.*
Rosberg, Z.; Hai Le Vu; Zukerman, M.; White, J.; "Blocking probabilities of optical burst switching networks based on reduced load fixed point approximations"; Twenty-Second Annual Joint Conference of the IEEE Computer and Communications Societies. IEEE vol. 3, Mar. 30-Apr. 3, 2003 pp. 2008-2018.*
OIF Implementation Agreement "UNI 1.0 Signaling Specification", The Optical Internetworking Forum, Oct. 2001.
IETF Draft "Generalized Multi-Protocol Label Switching (GM-PLS) Architecture", work-in-progress draft-ietf-ccamp-gmpls-architecture-03.txt, Aug. 2002.

* cited by examiner

*Primary Examiner*—Thai D Hoang
(74) *Attorney, Agent, or Firm*—Thorp Reed & Armstrong, LLP

(57) ABSTRACT

Methods, systems, and devices utilizing port dimensioning strategies for supporting, for example, bandwidth-on-demand ("BoD") services in networks. At a given node, the traffic load consists of several components, such as an access component, which is generated by demands terminated at that node, and a transit component, which is generated by demands that transit electronically through the node. Given the BoD load at a node, as well as a target BoD average blocking probability, a desired static allocation of the ports is provided between ports of a first type (such as client-side ports) and ports of a second type (such as network-side ports). In addition, a dynamic sharing strategy of the ports is also disclosed.

20 Claims, 7 Drawing Sheets

SYSTEMS, DEVICES, AND METHODS UTILIZING PORT DIMENSIONING STRATEGIES

CROSS-REFERENCE TO RELATED APPLICATIONS

This application claims priority from U.S. Provisional Patent Application No. 60/500,027, filed Sep. 4, 2003.

STATEMENT REGARDING FEDERALLY SPONSORED RESEARCH AND DEVELOPMENT

Not Applicable.

FIELD OF THE INVENTION

The present invention is directed generally to systems, devices, and methods and, more particularly, to communications systems, devices, and methods which utilize port dimensioning strategies.

BACKGROUND OF THE INVENTION

Today's intelligent optical networks allow carriers to offer not only the traditional permanently provisioned bandwidth services but also the dynamically provisioned bandwidth-on-demand (BoD) services and optical virtual private network (O-VPN) services resulting in a more cost-effective service layer network. Deploying a BoD service requires the implementation of control plane signaling and routing protocols. Standards for interoperable control plane implementations are being developed by the OIF, the IETF, and the ITU. The OIF generated a specification for an optical user-to-network interface (O-UNI) (See, for example, OIF Implementation Agreement "UNI 1.0 Signaling Specification", The Optical Internetworking Forum, October 2001). The effort in IETF, which is under the generalized multi-protocol label switching (GMPLS) umbrella, resulted in the generation of an architecture document (IETF Draft "Generalized Multi-Protocol Label Switching (GM-PLS) Architecture", work-in-progress draft-ietf-ccamp-gmpls-architecture-03.txt, August 2002.) and is finalizing a number of routing, signaling, and link management specifications. The ITU is also undertaking a similar effort under the automatically switched optical network (ASON) umbrella (ITU-T Recommendation G.8080 "Architecture for the automatically switched optical networks (ASON)", International Telecommunications Union, November 2001). These efforts at the standards bodies are progressing, and the goal of interoperability will be assessed when these protocols are deployed in the field.

Given that data traffic (in particular IP traffic) is becoming predominant, IP router connectivity is increasingly provided by wavelength services at OC-48/OC-192 rate and soon OC-768 (40 Gbps). Consequently, IP routers are expected to be the primary client devices attached to the optical network. It is worth noting however, that typically the BoD requests are due to finer granularity dynamic connection activity at the IP flow level such as MPLS traffic engineered flows or label switched paths (LSPs) which typically originate at a non-core router. The core routers multiplex a number of these IP flows over a wavelength connection through the optical network. In addition, dynamic wavelength services will be needed to support BoD for future high bandwidth applications (optical dial-tone). In the conventional IP-over-optical reference model, the optical network consists of OXCs (which are discrete or stand-alone switching elements, typically with an O-E-O switching fabric) connected by WDM point-to-point links. In this model, every wavelength is converted to the electronic domain at each node (i.e., there is no optical bypass) even if the majority of the wavelengths entering each node are not carrying traffic that is destined for that node (this is known as the transit traffic). With the advent of ultra long reach optical transmission and optical bypass capabilities, optical signals can travel long distances, and optically bypass several intermediate nodes without converted to the electronic domain at intermediate nodes. Accordingly, for transit traffic, it is not necessary to electronically terminate every wavelength entering a node (for instance the A-C connection shown in FIG. 3 optically bypasses site B). Since O-E-O conversion is not needed for the wavelengths that optically bypass a node, fewer transmitter and receiver (TxRx) interfaces are needed and a smaller OXC size is required, which results in a dramatic reduction in the overall network cost (See, for example, A. A. M. Saleh, "Transparent Optical Networking in Backbone Networks", in Proceedings of OFC 2000, paper ThD7, March 2000.).

A framework that captures such paradigm is that of a two-layer optical network architecture; a reconfigurable OXC layer (where the OXC, is a wavelength-granularity switch which could be based on an electronic (O-E-O) or optical (O-O-O) switching fabric) that provides the cross-connection functionality, over a reconfigurable all-optical layer (where reconfigurability is accomplished through integrated all-optical switches and optical add/drop multiplexers as well as tunable line TxRx interfaces) that provides efficient transport capability. This architecture is depicted in FIG. 3.

Since the optical reach in a given network is dependent on a number of parameters (fiber characteristics, chromatic dispersion, nonlinear effects, etc.), there is always a limit on how far an all-optical connection can extend. When this limit is reached, the optical signal has to be regenerated before being able to propagate further. Accordingly, if the distance between the end-nodes is more than the system reach in the optical domain, two or more optical segments must be concatenated to form an end-to-end connection. This concatenation or cross-connection can be accomplished dynamically and automatically by the OXC (the A-D connection in FIG. 3 requires a cross-connection at site C to cross-connect the A-C and C-D segments). In the absence of such OXC, this cross-connection is accomplished manually by connect a receiver to a transmitter either directly or via a fiber patch panel, or by using a regenerator that include both the receiver and transmitter along with signal regeneration processors.

The present invention addresses optimal port allocation strategies to dimension the OXCs in support of BoD wavelength services with a given target performance expressed in terms of average connection blocking probability in an optical network based on the aforementioned two-layer architecture. Those and other embodiments of the present invention will be described in the following detailed description. The present invention addresses the needs described above in the description of the background of the invention by providing improved systems, devices, and methods. These and other teachings, variations, and advantages of the present invention will become apparent from the following detailed description of the invention.

BRIEF SUMMARY OF THE INVENTION

The present invention is directed to systems, devices, and methods utilizing port dimensioning strategies. The present invention may be utilized, for example, with or as an optical cross-connect (OXC) port dimensioning strategy for supporting, for example, bandwidth-on-demand (BoD) services in networks. At a given node, the traffic load may consist of several components, such as, for example, an access component, which is generated by demands terminated at that node, and a transit component, which is generated by demands that transit electronically through the node. Given the BoD load at a node, as well as a target BoD average blocking probability, the present invention discloses static port allocation ("SPA") strategies for the OXC ports between ports of a first type, such as client-side ports, and ports of a second type, such as network-side ports. The present invention also introduces a dynamic port allocation ("DPA") sharing strategy of the ports (e.g., the network side ports) and proposes a method for determining the optimal port allocation under this strategy. The present invention demonstrates that the above strategies yield significant cost savings as compared to conventional allocation which is proportional to the components of the load.

In various embodiments of the present invention, port allocation is determined by minimizing average blocking probability (wherein averaging is accomplished by weighting the blocking probability by the respective load ratio) for each port type. For example, one embodiment of the present invention is a communications device of at least two ports, s ports of a first type, and the remaining ports of a second type. In that embodiment, "s" can be calculated by minimizing the total of the products of the load ratio and blocking probability for each port type. One way to solve for "s" is to minimize the expression: $pP_A+(1-p)P_T$, wherein p is a first type load ratio, comprising the ratio of a first type load to a total load, $P_A$ is a blocking probability associated with the first type load and is a function of s, and $P_T$ is a blocking probability associated with a second type load and is a function of s. Many other embodiments of the present invention will be described below, including systems and methods, and variations on determining the port allocation for each.

The present invention is generally described relative to embodiments that employ one type of average blocking probability to allocate ports. However, the advantages of the present invention can be realized using various types of blocking probability weighting. In one embodiment, the average blocking probability may be minimized subject to certain constraints. For example, it may be advantageous for the blocking probability of one type of port to be significantly lower than that of another type of port, and the present invention may be used to minimize the average blocking probability while maintaining the blocking probability of one type of port a predetermined amount lower than that of another type of port. In another embodiment, the present invention may be used to minimize the average blocking probability while the number of ports of a certain type do not exceed a certain number, or while maintaining a minimum number of ports of a certain type. In other embodiments, the load ratio "p" may include an offset factor or a adjustment coefficient to obtain a minimum average blocking probability subject to the offset or coefficient.

Furthermore, the invention will generally be described in terms of "client side" ports and "network side" ports, access loads and transit loads, and other exemplary teachings such as load ratios and blocking probabilities. However, the present invention is applicable to a broad range of systems, devices, and methods in which, for example, the ports may be other than client side ports and network side ports, and the loads may be other than access loads and transit loads, and other specific examples may be varied in accordance with the present invention. For example, ports may be two or more different types of ports, such as ports of a first type (e.g., client side ports or other types of ports) and ports of a second type (e.g., network side ports or other types of ports). Similarly, the present invention applies to loads other than access loads and transit loads, and the invention is not limited to other specific examples set forth herein.

Furthermore, although the present invention will generally be described in terms of optical cross-connects, the present invention is also applicable to other devices, such as switches, routers, and electrical cross-connects. In addition, although the present invention will generally be described in terms of optical communications devices, systems, and methods, the present invention is also applicable to other devices, systems, and methods, such as those which operate with signals in the electrical domain, as well as those which operate with signals in both the electrical and optical domains.

BRIEF DESCRIPTION OF THE SEVERAL VIEWS OF THE DRAWINGS

Examples of the present invention will be described, by way of example only, with reference to the accompanying drawings, wherein.

DETAILED DESCRIPTION OF THE INVENTION

Figure 1:
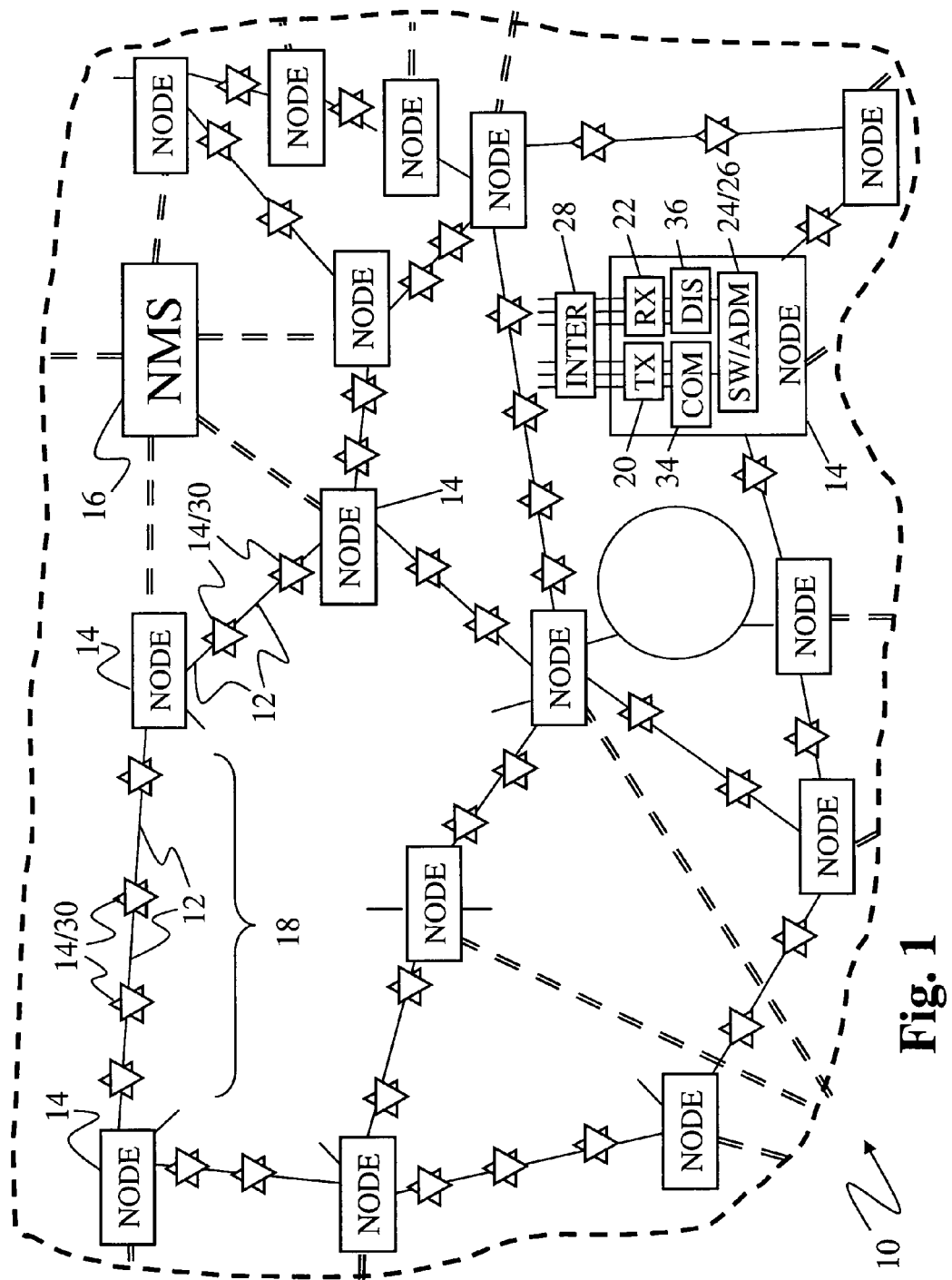
FIGS. 1 and 2 illustrate examples optical communications systems.

FIG. 1 illustrates an optical communications system 10 which includes optical paths 12 connecting nodes and network elements 14. Advantages of the present invention can be realized with many system 10 configurations and architectures, such as an all optical network, one or more point to point links, one or more rings, a mesh, other architectures, or combinations of architectures. The system 10 illustrated in FIG. 1 is a multi-dimensional network, which can be implemented, for example, as an all optical mesh network, as a collection of point to point links, or as a combination of architectures. The system 10 can employ various signal formats, and can also convert between formats. The system 10 can also include more or less features than those illustrated herein, such as by including or deleting a network management system ("NMS") 16 and changing the number, location, content, configuration, and connection of nodes 14.

The optical paths 12 can include guided and unguided transmission media, such as one or more optical fibers, ribbon fibers, planar devices, and free space devices, and can interconnect the nodes 14 providing optical communication paths through the system 10. Various types of transmission media can be used, such as dispersion shifted ("DSF"), non-dispersion shifted ("NDSF"), non-zero dispersion shifted ("NZDSF"), dispersion compensating ("DCF"); polarization maintaining ("PMF"), single mode ("SMF"), multimode ("MMF"), other types of transmission media, and combinations of transmission media. Furthermore, the transmission media can be doped, such as with erbium, germanium, neodymium, praseodymium, ytterbium, other rare earth elements, other dopants, and mixtures thereof. The paths 12 can carry one or more uni- or bi-directionally propagating optical signal channels or wavelengths. The optical signal channels can be treated individually or as a single group, or they can be organized into two or more wavebands or spectral groups, each containing one or more optical signal channel. The optical signal channels within a spectral group are all treated the same. For example, all optical signal channels in a spectral group are switched in the same manner, and all are dropped at the same locations, even if every optical signal channel in the spectral group is not utilized at every location at which it is dropped. The use of spectral groups to treat groups of channels in the same manner is one way to efficiently manage large numbers of optical signal channels. One or more paths 12 can be provided between nodes 14 and can be connected to protection switching devices and/or other redundancy systems. The optical path 12 between adjacent nodes 14 is typically referred to as a link 18, and the optical path 12 between adjacent components along a link 18 is typically referred to as a span.

The nodes and network elements 14 can include one or more signal processing devices including one or more of various optical and/or electrical components. The nodes 14 can perform network functions or processes, such as switching, routing, amplifying, multiplexing, combining, demultiplexing, distributing, or otherwise processing optical signals. For example, nodes 14 can include one or more transmitters 20, receivers 22, switches 24, add/drop multiplexers 26, amplifiers 30, interfacial devices 28, multiplexers/combiners 34, and demultiplexers/distributors 36, as well as filters, dispersion compensating and shifting devices, monitors, couplers, splitters, and other devices. One embodiment of one node 14 is illustrated in FIG. 1, although the nodes 14 can have many other variations and embodiments. Additional examples of nodes 14 are described in U.S. patent application Ser. No. 09/817,478, filed Mar. 26, 2001, and U.S. Pat. No. 6,344,922, issued Feb. 5, 2002, both of which are incorporated herein by reference.

The NMS 16 can manage, configure, and control nodes 14 and can include multiple management layers that can be directly and indirectly connected to the nodes 14. The NMS 16 can be directly connected to some nodes 14 via a data communication network (shown in broken lines) and indirectly connected to other nodes 14 via a combination of a directly connected node and communications paths in the optical system 10. The data communication network can, for example, be a dedicated network, a shared network, or a combination thereof. A data communications network utilizing a shared network can include, for example, dial-up connections to the nodes 14 through a public telephone system. The NMS 16 can reside at one or more centralized locations and/or can be distributed among components in the system 10. Mixed data or supervisory channels can be used to provide connections between the network elements of the NMS 16, which can be located in nodes 14 or remote from nodes 14. The supervisory channels can be transmitted within and/or outside the signal wavelength band and on the same medium or a different medium than the wavelength band. Examples of an NMS 16 are described in U.S. Patent Application Ser. No. 60/177,625, filed Jan. 24, 2000, and PCT Patent Application PCT/US01/02320, filed Jan. 24, 2001 (published as WO 01/54425), both of which are incorporated herein by reference.

The transmitters 20 and receivers 22 are configured respectively to transmit and receive optical signals including one or more information carrying optical signal wavelengths, or channels, via the optical paths 12. The transmitters 20 and receivers 22 can be used in multiple and single channel systems, and can provide varying reach (e.g., short, intermediate, and long reach). The transmitters 20 and receivers 22 can also be part of a device that includes standardized interface transmitters and receivers, such as to support interoperability with other devices and systems, which is particularly useful in WDM applications.

The transmitters 20 include an optical source that provides an optical carrier and can utilize, for example, coherent or incoherent sources, and narrow band or broad band sources, such as distributed feedback ("DFB") sources, distributed Bragg reflection ("DBR") sources, sliced spectrum sources, fiber lasers, semiconductor lasers, light emitting diodes, and other optical sources. The transmitters 20 often include a narrow bandwidth laser as the optical source. The transmitter 20 can impart information onto the optical carrier or onto one or more subcarriers or sidebands. Typically, information is imparted by directly modulating the optical source, by externally modulating the optical carrier, or by modulating the information onto one or more subcarriers or sidebands of the optical carrier, with the later sometimes called sub-carrier modulation ("SCM"). The transmitter 20 may utilize one or more types of modulators, such as electro-optic (e.g., lithium niobate), electro-absorptive, etc.

The receiver 22 can include various detection techniques, such as coherent detection, optical filtering and direct detection, as well as other techniques and combinations thereof. The receiver 22 can include filters, such as fiber Bragg grating filters, bulk grating filters, or other types of filters, or filtering can be performed outside of the receiver 22.

The transmitters 20 and receivers 22 can utilize one or more formats to transmit and receive optical signals. For example, modulation formats such as amplitude modulation, frequency modulation, phase modulation, polarization modulation, power modulation, other modulation formats and combinations of formats, such as quadrature amplitude modulation, can be used. Also, return to zero ("RZ") or non-return to zero ("NRZ") formats can be used with various modulation techniques. Different encoding formats can also be used, such as differential encoding, duobinary encoding, other encoding formats, and combinations thereof. One or more multiplexing formats can be employed, such as space, time, code, frequency, phase, polarization, wavelength, other types, and combinations thereof. The format can also include one or more protocols, such as SONET/SDH, IP, ATM, Digital Wrapper, GMPLS, Fiber Channel, Ethernet, etc. Other signal formats, such as soliton, pulse, chirp, etc, can also be used. Transmitters 20 and receivers 22 can utilize the same format for all channels throughout the system 10, or different formats can be used for different channels and/or in different parts of the system 10, with appropriate format conversion being performed by the transmitters 20 and receivers 22 or by other devices. Examples of optical transmitters 20 are described in U.S. Pat. No. 6,118,566, issued Sep. 12, 2000, which is incorporated herein by reference.

Tunable transmitters 20 and receivers 22 can be used, such as to provide flexibility in the selection of wavelengths used in the system 10. The transmitters 20 and receivers 22 can also include or be associated with other components to perform other signal processing, such as reshaping, retiming, error correction, protocol processing, pre-emphasis, and optical and/or electrical pre- and post-dispersion and distortion compensation. For example, receivers 22 can be connected to the transmitters 20 in back to back configuration as a transponder or regenerator. The regenerator can be deployed as a 1R, 2R, or 3R regenerator, depending upon whether it serves as a repeater (R1: repeat), a remodulator (R2: reshape & repeat), or a full regenerator (R3: reshape, retime, repeat), respectively. The transmitters 20 and receivers 22 in a WDM system can be operated in a uniform manner or the transmission and reception characteristics of the signal channels can be tailored individually and/or in groups.

The switches 24 can take many forms and can have different levels of "granularity". "Granularity" refers to the resolution or precision with which the switching is performed. For example, WDM switches 24 can switch individual wavelengths (also called "channels"), groups of wavelengths, or portions of wavelengths. Before being switched, the signals can be demultiplexed into the appropriate level of granularity, and after being switched the signals can be multiplexed into the desired format, using the same or different modulation formats, wavelengths, or other characteristics.

Switches 24 can have electrical, optical, or electrical/optical switch "fabrics". The switch "fabric" refers to the technology used to perform the switching. Switches 24 having an electrical fabric convert incoming optical signals into electrical signals, the electrical signals are switched with electronic equipment, and the switched electrical signals are converted back into optical signals. Such switching is often referred to as "O-E-O" ("optical-electrical-optical") switching. In contrast, switches 24 having an optical switch fabric perform the switching with the signals in the optical domain. However, switches 24 having an optical switch fabric can still perform O-E-O conversions, such as when demultiplexing or multiplexing optical signals, or in other related interface devices or operations.

There are many optical switch fabrics, some of which use micro-electromechanical systems ("MEMS"), such as small, electrically-controlled mirrors, to selectively reflect an incoming optical signal to a desired output. Other optical switch fabrics use a variable index of refraction device to controllably change the index of refraction of an optical signal path, such as by forming a gas pocket in an optically transparent liquid medium, in order to change the direction of the optical signal. Yet another example of an optical switch fabric is the use of an optical path in which the optical gain and/or loss can be controlled so that an optical signal can be either passed or blocked. Some examples of switches 24 having an optical fabric are described in U.S. patent application Ser. No. 09/119,562, filed Jul. 21, 1998, and 60/150,218, filed Aug. 23, 1999, and PCT Patent Application PCT/US00/23051, filed Aug. 23, 2000 (published as WO 01/15368), all of which are incorporated herein by reference.

Switches 24 can be grouped into two categories: integrated switches and interfacial switches. Integrated switches allow for optical continuity of signals, while interfacial switches introduce an optical discontinuity which interrupts optical signals with one or more O-E-O conversion, either in the switch itself or in a related component such as a multiplexer 34, demultiplexer 36, or other interface device. In contrast, integrated switches are optically integrated into the system 10 and allow optical signals to continue through the system 10, via the integrated switch 24, without an O-E-O conversion or optical discontinuity. Integrated switches 24 are sometimes called "all-optical switches", "O-O" switches, or "O-O-O" switches. Interfacial switches 24 are a type of interfacial device 28, which is discussed in more detail hereinbelow. Interfacial switches are located within or at the periphery of networks 10 and point to point links 18, such as between two or more point to point links 18, between two or more networks 10, or between a network 10 and a point to point link 18. A switch 24 can have both an integrated switch 24 portion and a interfacial switch 24 portion, such that some signals are switched without an O-E-O conversion, while other signals are subjected to an O-E-O conversion.

Switches 24 can have many forms and variations. For example, in addition to being integrated or dedicated, and having an optical and/or electrical switch fabric, a switch 24 can be polarization-sensitive or polarization-insensitive. As discussed hereinbelow in more detail, the present invention can produce a pair of optical signals which have orthogonal polarization and which occupy the same optical frequency range. A switch 24 which is polarization sensitive can switch those signals separately, possible sending them to different destinations. A polarization-insensitive switch 24 can also be used with such signals, but the pair of signals will be switched together such that both are switched to the same destination. For example, an integrated, polarization-insensitive switch 24 might filter the optical frequency range containing the orthogonally polarized pair of signals, and switch that filtered signal using an optical switch fabric, without regard to whether it contains a single signal or a pair of orthogonally polarized signals.

Add/drop multiplexers 26 and other devices can function in a manner analogous to integrated switches 24 so that, in general, only optical signals which are being "dropped" from the network 10 are converted into electronic form. The remaining signals, which are continuing through the network 10, remain in the optical domain. As a result, optical signals in an all-optical system 10 (e.g., systems 10 having integrated switches 24 and integrated add/drop multiplexers 26) are not converted into electrical form until they reach their destination, or until the signals degrade to the point they need to be regenerated before further transmission. Of course, add/drop multiplexers 26 can also be interfacial devices 28.

Interfacial devices 28 generally act as interfaces to and between optical networks 10 and/or point to point links 18. Interfacial devices 28 typically perform at least one optical-to-electrical ("O-E") or electrical-to-optical ("E-O") conversion. In the case of an interfacial switch 24, for example, signals are subjected to an O-E-O conversion before proceeding to the next link 18 or network 10. Interfacial devices 28 can, for example, act as an interface between electrical and optical systems or devices, between different formats, or at other interfaces. Interfacial device 28 can be located within or at the periphery of networks 10, such as between two or more networks 10, between two or more point to point links 18, and between networks 10 and point to point links 18. Interfacial devices 28 can include, for example, cross-connect switches, IP routers, ATM switches, etc., and can have electrical, optical, or a combination of switch fabrics. Interfacial devices 28 can provide interface flexibility and can be configured to receive, convert, and provide information in one or more various formats, protocols, encoding schemes, and bit rates to the transmitters 20, receivers 22, and other devices. The interfacial devices 28 also can be used to provide other functions, such as protection switching.

The optical amplifiers 30 can be used to provide signal gain, such as to overcome attenuation, and can be deployed proximate to other optical components, such as in nodes 14, as well as along the optical communications paths 12. The optical amplifiers 30 can include concentrated/lumped amplification and/or distributed amplification, and can include one or more stages. The optical amplifier can include, for example, doped (e.g. erbium, neodymium, praseodymium, ytterbium, other rare earth elements, other dopants, and mixtures thereof) and/or non-linear interaction amplifiers (e.g., Raman amplifiers, Brillouin amplifiers, etc.), and can be locally and/or remotely pumped with optical energy. The optical amplifiers 30 can also include other types of amplifiers 30, such as semiconductor amplifiers. Two or more amplifiers 30 may be co-located and concatenated to provide additional flexibility.

Optical combiners 34 can be used to combine the multiple signal channels into WDM optical signals for the transmitters 20. Likewise, optical distributors 36 can be provided to distribute the optical signal to the receivers 22. The optical combiners 34 and distributors 36 can include various multi-port devices, such as wavelength selective and non-selective ("passive") devices, fiber and free space devices, and polarization sensitive devices. Other examples of multi-port devices include circulators, passive, WDM, and polarization couplers/splitters, dichroic devices, prisms, diffraction gratings, arrayed waveguides, etc. The multi-port devices can be used alone or in various combinations with various tunable or fixed wavelength transmissive or reflective, narrow or broad band filters, such as Bragg gratings, Fabry-Perot and dichroic filters, etc. in the optical combiners 34 and distributors 36. Furthermore, the combiners 34 and distributors 36 can include one or more serial or parallel stages incorporating various multi-port device and filter combinations to multiplex, demultiplex, and/or broadcast signal wavelengths λi in the optical systems 10.

Figure 2:
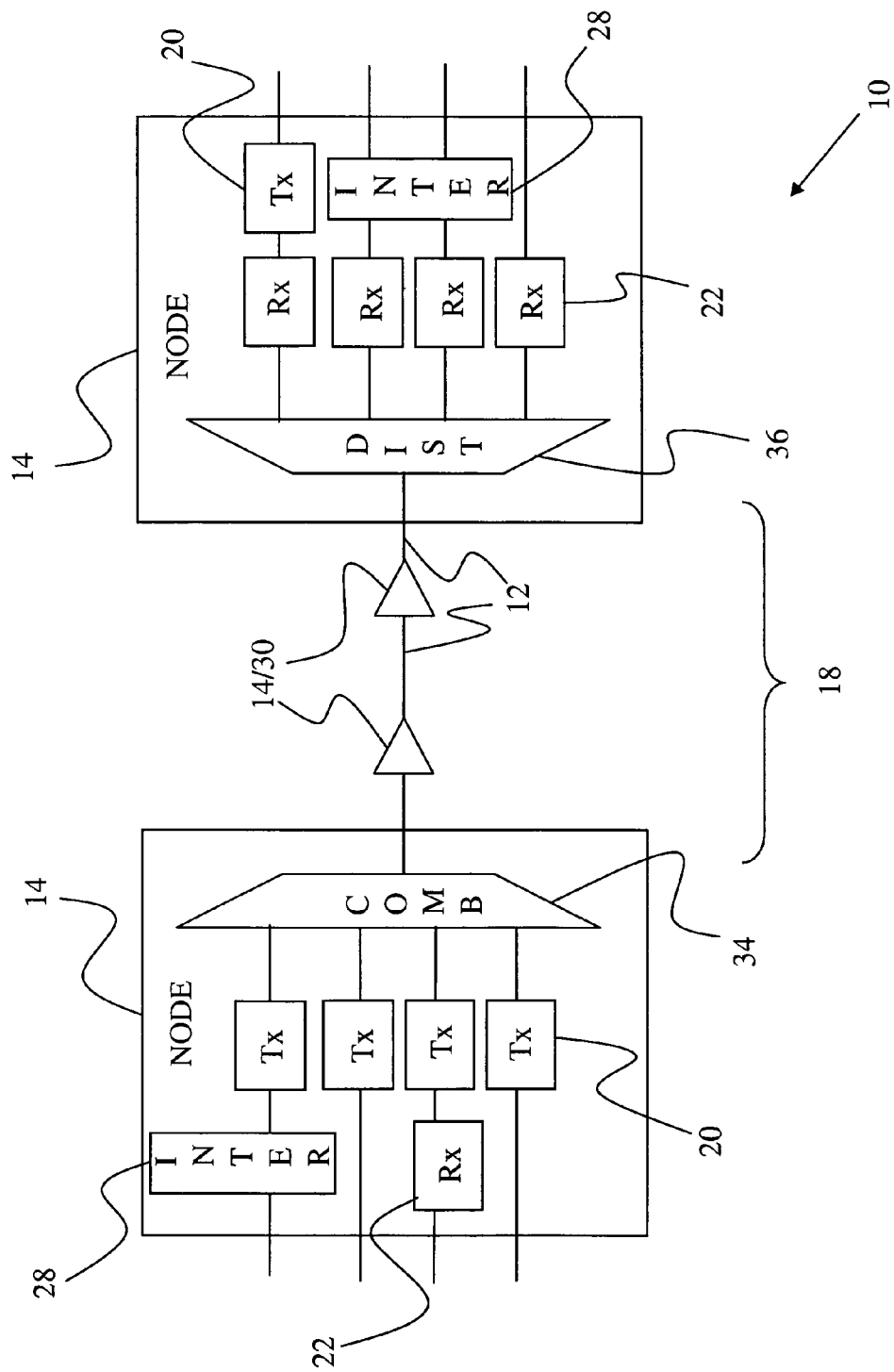

FIG. 2 illustrates another embodiment of the system 10 including a link 18 of four nodes and network elements 14. That system 10 can, for example, be all or part of a point to point system 10, or it may be part of a multi-dimensional, mesh, or other system 10. One or more of the nodes or network elements 14 can be connected directly to the network management system 16 (not shown). If the system 10 is part of a larger system, then as few as none of the nodes or network elements 14 can be connected to the network management system 16 and all of the nodes and network elements 14 can still be indirectly connected to the NMS 16 via another node or network element 14 in the larger system 10.

Figure 3:
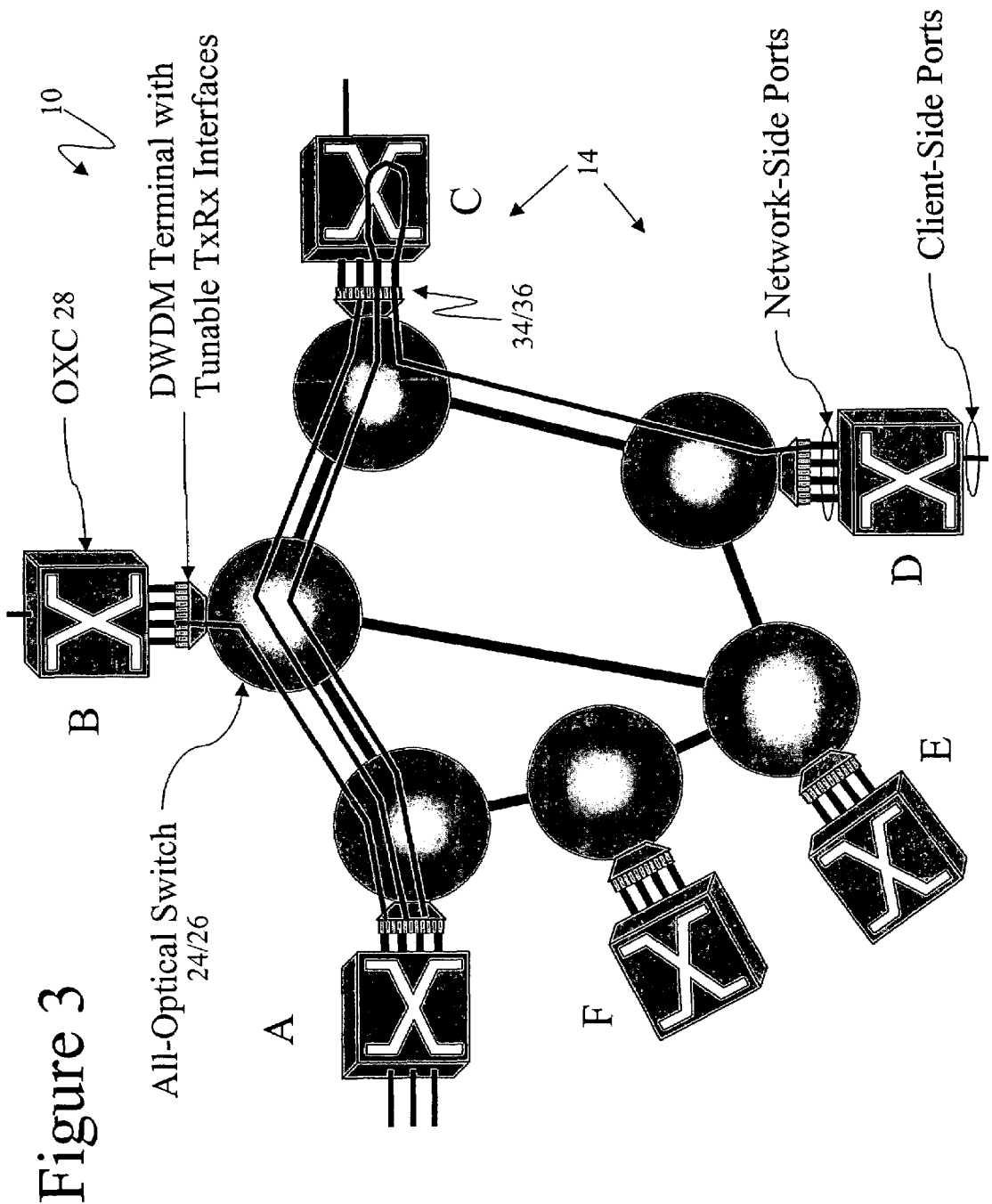
FIG. 3. illustrates a two-layer optical network architecture with an OXC layer over a reconfigurable all-optical layer.

FIG. 3. illustrates a two-layer optical network architecture with an OXC layer over a reconfigurable all-optical layer. The system 10 illustrated in FIG. 3 differs from those illustrated in FIGS. 1 and 2, although the teachings of the present invention are applicable to those and other systems 10. As mentioned above, the present invention focuses on the OXC 28 port dimensioning and allocation problem from a nodal perspective. The general network aspects that allow the present invention to isolate one node 14 and develop the node model that will subsequently be analyzed will be described below. For a given source-destination node 14 pair (s,d), it is assumed that the BoD wavelength connection requests arrive according to a Poisson process with an average arrival rate of $\lambda_{sd}$ requests per unit time. The holding times of the BoD connections are assumed to be exponentially distributed with an average holding times of $1/\mu_{sd}$. The network-wide BoD traffic demand is captured in a BoD traffic matrix whose (s,d)-th entry represents the load $\rho_{sd}=\lambda_{sd}/\mu_{sd}$ between node s and node d. These loads (measured in Erlangs) could be either estimated or based on actual field measurements. From the perspective of an OXC 28 at a given node 14, the BoD traffic load ρ consists of two components; an access component $\rho_a$, which is generated by demands terminating at that node 14, and a transit component $\rho_t$, which is generated by demands that transit electronically through the OXC 28 as shown in FIG. 3.

The access load component at a node 14 can be calculated from the demand matrix, by adding up all demands that terminate on the OXC 28, whereas the transit load component can be obtained as follows. In the network design phase the BoD traffic matrix, treated as a static load, can be used along with other potential traffic as the basis for network planning purposes, during which the all-optical network layer is determined (topology/capacity). In the case of addressing the problem of OXC 28 port dimensioning, it will be assumed that with adequate planning of all-optical layer resources and the availability of an agile all-optical layer, the blocking performance for BoD services is solely a function of the OXC 28 layer resources. In other words, it is assumed that the all-optical layer resources are not limiting.

Second, when the BoD matrix load is routed as a static load between the OXCs across the all-optical layer according to an off-line routing policy adopted in the network, it results in a static transit load through each OXC 28. Note that a different network architecture and corresponding routing policy would result in a different transit load per OXC 28. For instance, for a given routing policy, a network with longer optical reach capability results in less transit load per OXC 28 than a network with shorter optical reach. Similarly, given the same optical reach capability, a different routing policy would result in a different transit load as well.

For the same network architecture (in particular the optical reach capability) and with an on-line routing policy (for routing the dynamic demands one-by-one) that is consistent with the off-line routing policy, the average of the dynamic transit load will be the same as the static transit load. Accordingly, transit load $\rho_t$ can be calculated as the sum of the static transit loads from all demands routed through the OXC 28.

The problem can then be formulated as follows: consider an X×Y OXC 28 at a given node 14 with a total offered load of ρ=λ/μ Erlangs. The access portion of the load is given by $\rho_a=p\rho$ where $0\leq p\leq 1$ and the transit portion of the load is then given by $\rho_t=(1-p)\rho$. The parameter p will be referred to as the access load ratio. The objective is to determine the optimal OXC 28 port allocation between the client-side and the network-side that minimizes the average blocking probability at the node 14 under consideration (i.e. the probability of the event that there are not enough ports to support a connection at that node 14). To assist in quantifying the effect of different port allocation strategies on blocking performance, the total OXC 28 load is fixed, and the load components vary. In an alternate formulation that aims at quantifying the effects of optical bypass on the required OXC 28 size, the access load would be fixed and the transit load would be varied.

One embodiment of the present invention includes static port allocation ("SPA") of an N-port OXC 28, with $s\leq N/2$ ports allocated to the client-side to serve the access load (i.e. s ports are connected to edge devices such as IP routers). Accordingly, out of the remaining N−s network-side ports, s ports are allocated to the access load, and N−2s ports are allocated to serving the transit load. According to this embodiment, the access blocking probability $P_A$ (the blocking probability associated with the access load) is given by $$P_A=E[\rho p,s],$$

where E[α,n] is the Erlang-B formula given by $$E[\alpha,n] = \frac{\alpha^n/n!}{\sum_{i=0}^{n} \alpha^i/i!}.$$

Similarly, the transit blocking probability $P_T$ (the blocking probability associated with the transit load) is given by $$P_T=E[(1-p)\rho,\lfloor(N-2s)/2\rfloor].$$

The overall average blocking probability $P_B$ is then $$P_B=pE[\rho p,s]+(1-p)E[(1-p)\rho,\lfloor(N-2s)/2\rfloor] \quad (1)$$

and the optimal static port allocation strategy, which is referred to as O-SPA, is the one that minimizes $P_B$ in equation (1), or $$s^* = \min_s pE[\rho p, s] + (1-p)E[(1-p)\rho, \lfloor (N-2s)/2 \rfloor]$$

Figure 4:
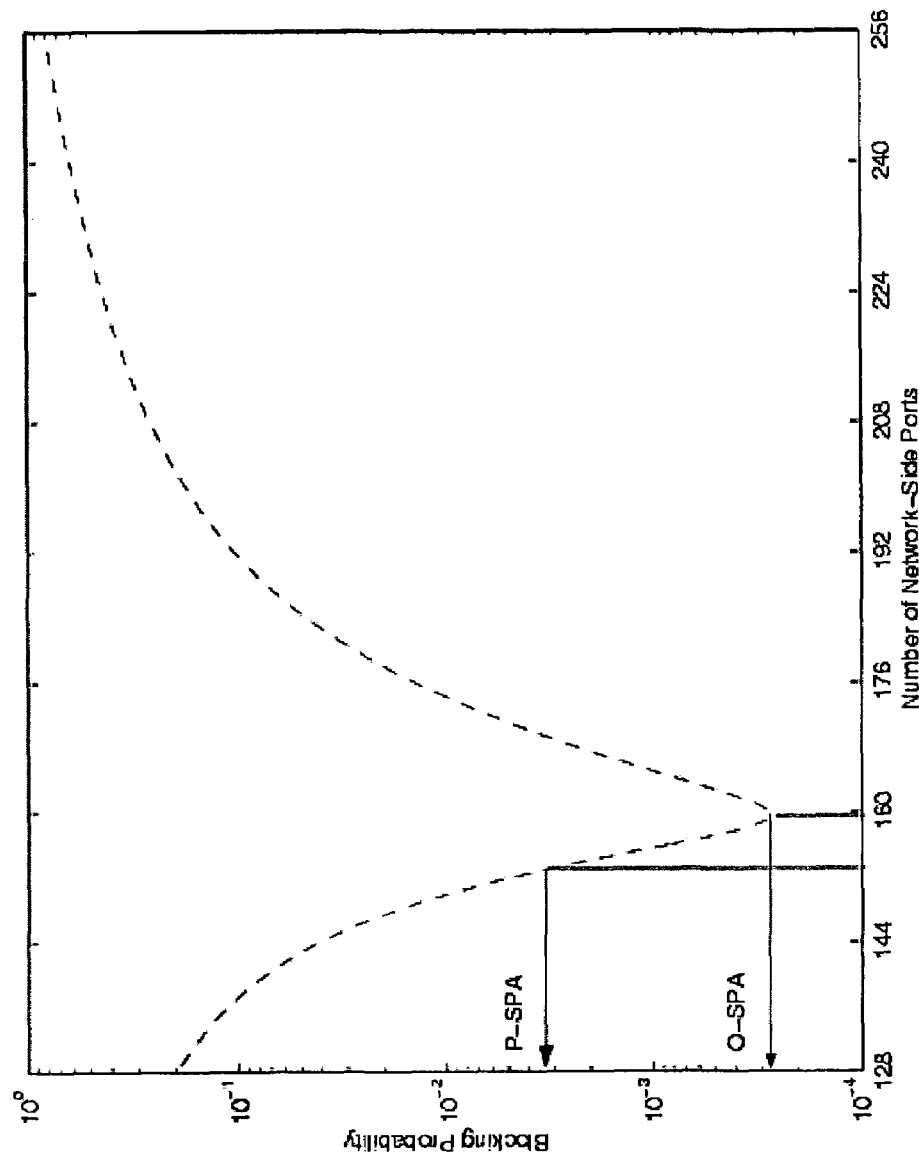
FIG. 4. illustrates the effect of port allocation strategy on blocking probability for N=256, ρ=85 Erlangs, and p=0:8.

The above result are applied to a node 14 with an OXC 28 of size N=256, and a load ρ=85 Erlangs, 80% of which is an access load, i.e. an access load ratio p=0:8. The port allocation based on O-SPA is 97 ports to the client-side and 159 ports to the network-side. If the port allocation is based on the proportion of the access load and the transit load (Proportional SPA or P-SPA), this would result in 103 client-side ports and 153 network-side ports. It is not surprising that the port allocation resulting from O-SPA is different from that obtained from P-SPA, however, it is interesting to note that even though the port allocations resulting from both strategies are not substantially different, there is an order of magnitude difference in the resulting average blocking probability as seen in FIG. 4. This difference can be directly translated into OXC 28 port savings, since a more efficient port allocation strategy can achieve the same average blocking probability as that realized by the P-SPA strategy but with fewer OXC 28 ports as will be shown later.

In the SPA strategies, out of the N−s network-side ports, s ports are allocated to the access load. Hence, if a transit connection request arrives when all N−2s ports allocated to the transit load were in use, the connection request will be blocked even if some of the s network-side ports allocated to the access load were idle. A more efficient port allocation strategy is one that allows sharing of the network-side ports among both load types. Such a strategy is called "Dynamic Port Allocation (DPA)". In this case, the transit load can share into all N−s network-side ports (as opposed to only N−2s for the SPA strategies) while, as before, the access load can use only up to ports (since there are only s client-side ports). Even though there is an asymmetry in resource allocation that favors the transit load, numerical results provided below demonstrate that DPA results in an overall improvement in the average blocking probability over SPA strategies.

Figure 5:
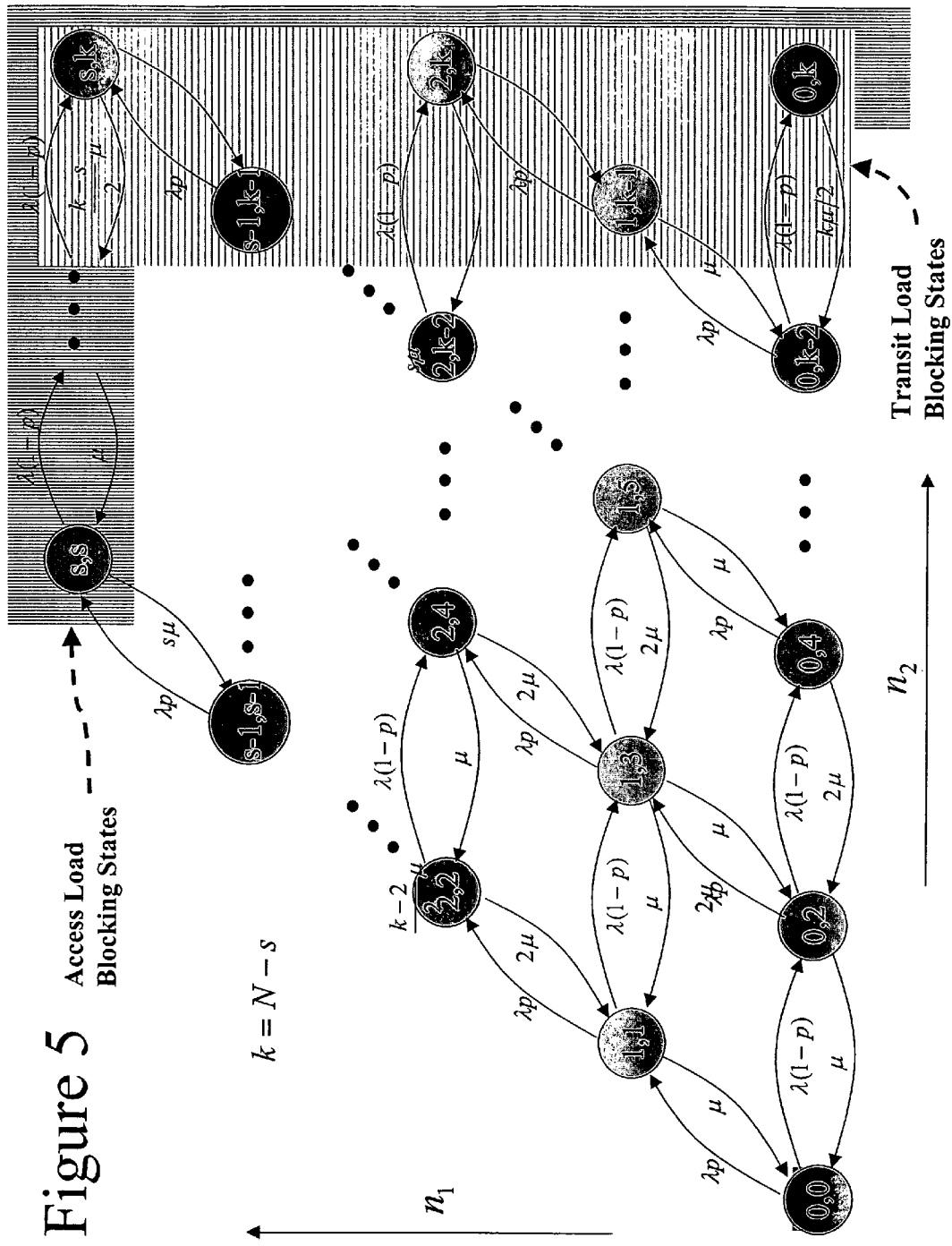
FIG. 5. illustrates a Markov Chain for the state of the OXC under the DPA strategy.

Under the DPA strategy, the state of the OXC 28 can be described by the doublet $(N_1=n_1, N_2=n_2)$, where $n_1$ is the number of client-side ports in use and $n_2$ is the number of network-side ports in use. The state of OXC 28 evolves according to a Markov Chain as shown in FIG. 5.

The steady state probabilities $P(n_1,n_2)$=Prob. $(N_1=n_1, N_2=n_2)$ of the Markov Chain to obtain $$P(n_1, n_2) = \frac{p(n_1, n_2)}{\sum_{(i,j) \in S} p(i, j)} \text{ for } (n_1, n_2) \in S \text{ where}$$

$$p(n_1, n_2) = \frac{[p\rho]^{n_1}[(1-p)\rho]^{\frac{n_2-n_1}{2}}}{n_1! \frac{n_2-n_1}{2}!}$$

and S is the set of $(n_1,n_2)$ satisfying $n_1$=0, 1, 2, s, and $$n_2 = \begin{cases} n_1, n_1+2, \ldots, N-s & \text{if } n_1, N-s \text{ are of same parity} \\ n_1, n_1+2, \ldots, N-s-1 & \text{if } N-s+n_1 \text{ is odd} \end{cases}$$

The blocking states for the access and transit loads are indicated in FIG. 5, and accordingly their respective blocking probabilities can be calculated as follows $$P_A = \begin{cases} \sum_{n_2=s}^{2\lceil N/2 \rceil-s-2} P(s, n_2) + \sum_{n_1=0}^{\lfloor s/2 \rfloor} P(2n_1, N-s) & \text{if } N-s \text{ is even} \\ \sum_{n_2=s}^{2\lceil N/2 \rceil-s-2} P(s, n_2) + \sum_{n_1=1}^{\lfloor s/2 \rfloor} P(2n_1-1, N-s-1) & \text{if } N-s \text{ is odd} \end{cases}$$

and $$P_T = \sum_{n_1=0}^{\lfloor s/2 \rfloor} P(2n_1, 2\lfloor (N-s)/2 \rfloor) + \sum_{n_1=1}^{\lceil s/2 \rceil} P(2n_1-1, 2\lceil (N-s)/2 \rceil - 1)$$

The average blocking probability is then given by $$P_B = pP_A + (1-P)P_T$$

and the optimal port allocation under DPA strategy is then derived as $$s^* = \min_s pP_A + (1-p)P_T$$

Figure 6:
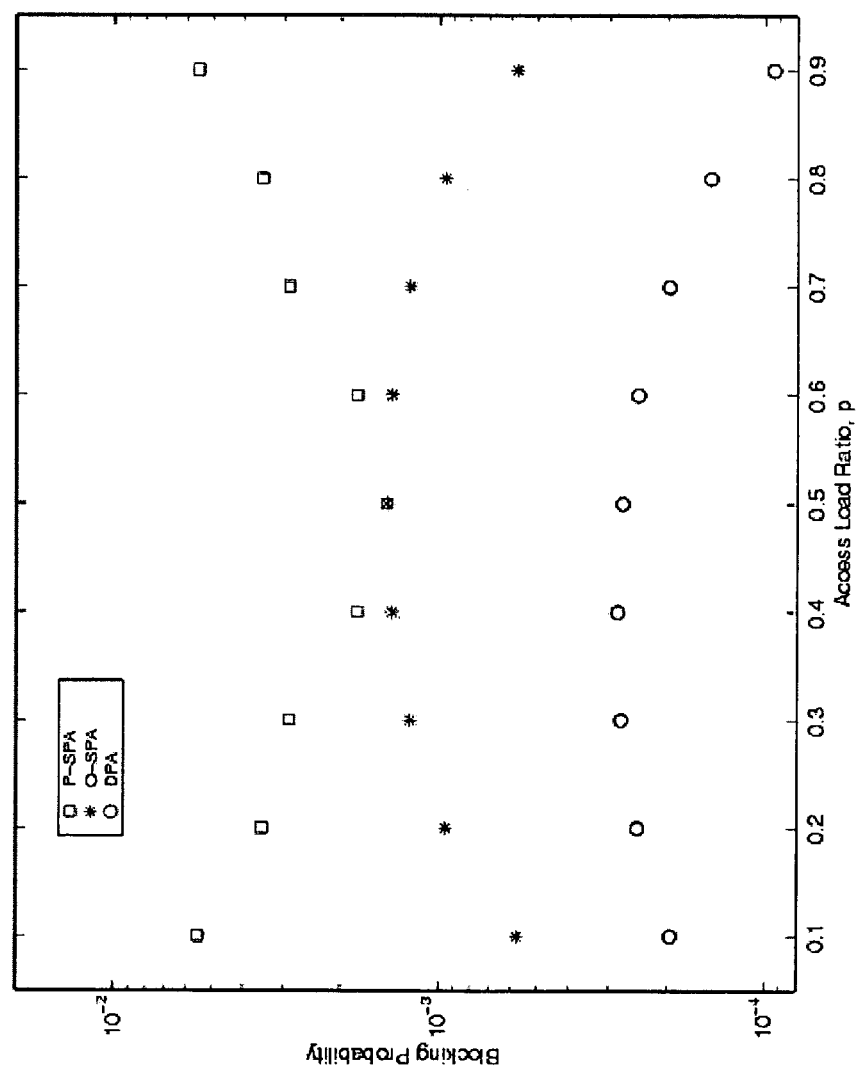
FIG. 6. illustrates average blocking probability as a function of p under the three port allocation strategies for N=256 and ρ=90 Erlangs.

FIG. 6 depicts the average blocking probability vs. the access load ratio for an OXC 28 of size N=256 with an aggregate load of ρ=90 Erlangs under the three strategies: O-SPA, DPA, and P-SPA. From this figure, one can make several observations: first, as expected, DPA results in the lowest blocking probabilities across the entire range of the access load ratio (by almost an order of magnitude), followed by O-SPA, then by P-SPA. Second, when the OXC 28 load is balanced, in the sense that it is split almost evenly between access load and transit load (when 0.4≦p≦0.6), P-SPA performs almost as good as O-SPA. However, if there is a load imbalance where the dominating component is either the access load (large p) or the transit load (small p), then O-SPA performance is clearly superior to that of P-SPA. The reason for this behavior is the following: in the imbalanced load regime, it is natural to expect that the port allocation will also be imbalanced, with low port count allocated to dominated load type (the smaller of the access and transit components) and a high port allocation for the dominating one (the larger component). It is precisely because of the lack of sufficient statistical multiplexing associated with the dominated load, that deviations away from the optimal port allocation (as in P-SPA) results in significant penalty in the blocking performance. In other words, O-SPA tends to allocate more ports to the dominated load type than P-SPA (to improve the blocking experienced by this component), and vice versa for the dominating load component so that overall it achieves a better blocking performance than P-SPA. Finally, while the performance of O-SPA is symmetrical relative to p=0.5 (balanced load), there is an asymmetry in the blocking performance of DPA which improves faster when the access load dominates (p>0.5) than when the transit load dominates (p<0.5). This can be explained again by the statistical multiplexing gain that is achieved since there are more ports available for the transit load to share into when the access load dominates. In this case, because s is larger when the access load is dominating, there are more ports available on the network side for the transit load to share with the access load, thus improving the overall blocking probability.

Figure 7:
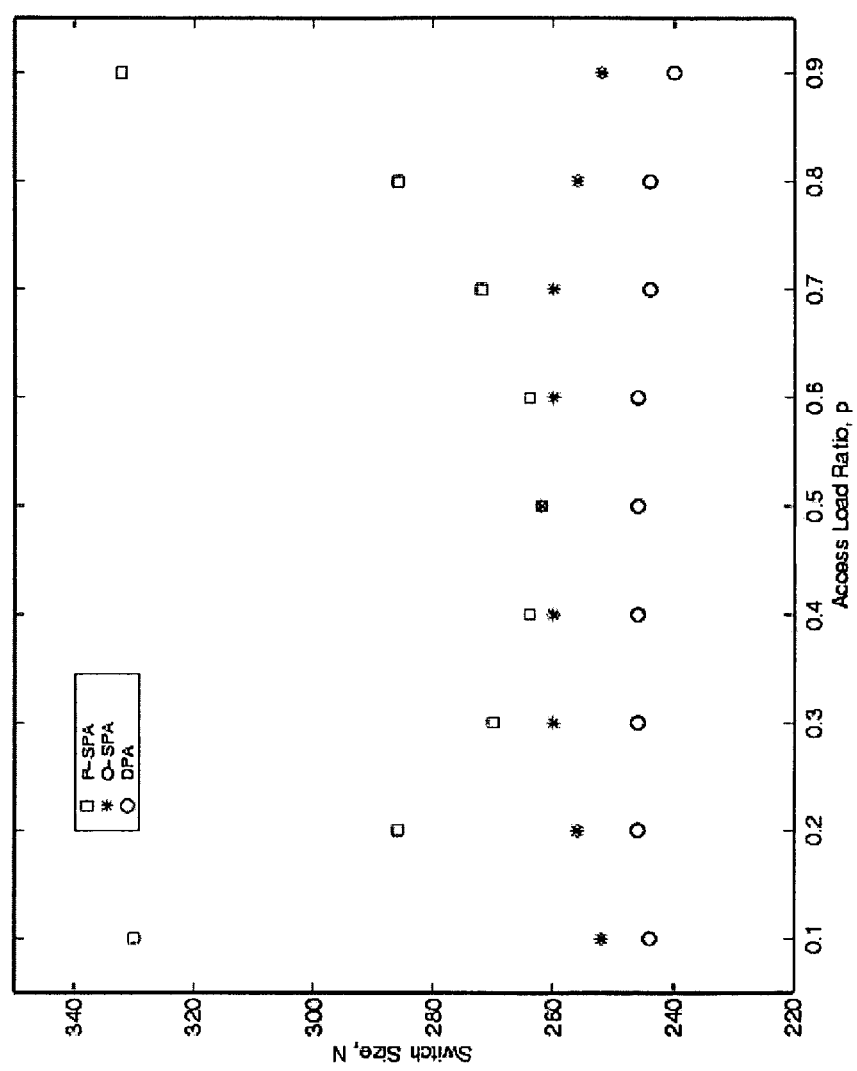
FIG. 7. illustrates required switch size N to achieve $10^{-3}$ blocking probability vs. access load ratio p, for a load ρ=90 Erlangs.

Alternatively, for a given blocking probability target and a given load, the more efficient port allocation strategies will result in fewer OXC 28 port requirements and hence will translate into network cost savings. FIG. 7 shows that DPA can result in savings between 8% and 38% fewer OXC 28 ports (depending on the value of the access load ratio) than P-SPA, while O-SPA can result in savings between 0% and 32% fewer OXC 28 ports than P-SPA.

Many variations and modifications can be made to described embodiments of the invention without departing from the scope of the invention, and it is intended that the foregoing specification and the following claims cover such modifications and variations.

The invention claimed is:

1. A communications device, comprising:
   N ports, wherein N is an integer number greater than 1;
   s ports of a first type, wherein s is a positive integer number;
   N−s ports of a second type; wherein s is a value which results in a minimum result for the expression $pP_A+(1-p)P_T$; wherein
   p is a first type load ratio, comprising the ratio of a first type load to a total load;
   $P_A$ is a blocking probability associated with the first type load and is a function of s; and
   $P_T$ is a blocking probability associated with a second type load and is a function of s.

2. The device of claim 1, wherein:
   ports of the first type are client side ports; and
   ports of the second type are network side ports.

3. The device of claim 2, wherein:
   $P_A = E[\rho p, s]$;
   $P_T = E[(1-p)\rho, \lfloor(N-2s)/2\rfloor]$, wherein
   $E[\alpha, n] = (\alpha^n/n!)/(\Sigma_{i=0}^{n}(\alpha^i)/i!)$, such that the terms $\alpha$, n, and i are defined according to the Erlang-B formula;
   $\rho$=traffic load on the device in Erlangs.

4. The device of claim 1, wherein s is a positive integer number less than N/2.

5. The device of claim 4, wherein the ports of the second type include:
   s access load ports; and
   N−2s transit ports.

6. The device of claim 5, wherein the N−s ports of the second type are dynamically allocated between access-load ports and transit ports.

7. The device of claim 6, wherein all of the N−s ports of the second type are dynamically allocated as transit ports.

8. The device of claim 7, wherein no more than s ports of the second type are dynamically allocated as access-load ports.

9. The device of claim 6, wherein:

$$P_A = \begin{cases} \sum_{n_2=s}^{2\lceil N/2\rceil-s-2} P(s, n_2) + \sum_{n_1=0}^{\lfloor s/2\rfloor} P(2n_1, N-s) & \text{if } N-s \text{ is even} \\ \sum_{n_2=s}^{2\lceil N/2\rceil-s-2} P(s, n_2) + \sum_{n_1=1}^{\lceil s/2\rceil} P(2n_1-1, N-s-1) & \text{if } N-s \text{ is odd} \end{cases}$$

$$P_T = \sum_{n_1=0}^{\lfloor s/2\rfloor} P(2n_1, 2\lfloor(N-s)/2\rfloor) + \sum_{n_1=1}^{\lceil s/2\rceil} P(2n_1-1, 2\lceil(N-s)/2\rceil-1)$$

$$P(n_1, n_2) = \frac{p(n_1, n_2)}{\sum_{(i,j)\in S} p(i, j)} \text{ for } (n_1, n_2) \in S$$

$$p(n_1, n_2) = \frac{[p\rho]^{n_1}[(1-p)\rho]^{\frac{n_2-n_1}{2}}}{n_1! \frac{n_2-n_1}{2}!}$$

and S is the set of $(n_1, n_2)$ satisfying $n_1$=0, 1, 2, . . . s; and $$n_2 = \begin{cases} n_1, n_1+2, \ldots, N-s & \text{if } n_1, N-s \text{ are of same parity} \\ n_1, n_1+2, \ldots, N-s-1 & \text{if } N-s+n_1 \text{ is odd} \end{cases}$$

wherein $\rho$=traffic load on the device in Erlangs.

10. A communications system, comprising:
   a plurality of transmitters;
   a plurality of receivers;
   transmission media connecting the plurality of transmitters with the plurality of receivers;
   at least one amplifier between at least one of the transmitters and at least one of the receivers; and
   at least one communications device between at least one of the transmitters and at least one of the receivers, wherein the communications device includes:
   N ports, wherein N is an integer number greater than 1;
   s ports of a first type, wherein s is a positive integer number;
   N−s ports of a second type; wherein s is a value which results in a minimum result for the expression $pP_A+(1-p)P_T$; wherein
   p is a first type load ratio, comprising the ratio of a first type load to a total load;
   $P_A$ is a blocking probability associated with the first type load and is a function of s; and
   $P_T$ is a blocking probability associated with a second type load and is a function of s.

11. The system of claim 10, wherein:
   $P_A = E[\rho p, s]$;
   $P_T = E[(1-p)\rho, \lfloor(N-2s)/2\rfloor]$, wherein
   $E[\alpha, n] = (\alpha^n/n!)/(\Sigma_{i=0}^{n}(\alpha^i)/i!)$ such that the terms $\alpha$, n, and i are defined according to the Erlang-B formula;
   $\rho$=traffic load on the device in Erlangs.

12. The system of claim 10, wherein:

$$P_A = \begin{cases} \sum_{n_2=s}^{2\lceil N/2\rceil-s-2} P(s, n_2) + \sum_{n_1=0}^{\lfloor s/2\rfloor} P(2n_1, N-s) & \text{if } N-s \text{ is even} \\ \sum_{n_2=s}^{2\lceil N/2\rceil-s-2} P(s, n_2) + \sum_{n_1=1}^{\lceil s/2\rceil} P(2n_1-1, N-s-1) & \text{if } N-s \text{ is odd} \end{cases}$$

$$P_T = \sum_{n_1=0}^{\lfloor s/2\rfloor} P(2n_1, 2\lfloor(N-s)/2\rfloor) + \sum_{n_1=1}^{\lceil s/2\rceil} P(2n_1-1, 2\lceil(N-s)/2\rceil-1)$$

$$P(n_1, n_2) = \frac{p(n_1, n_2)}{\sum_{(i,j)\in S} p(i, j)} \text{ for } (n_1, n_2) \in S$$

$$p(n_1, n_2) = \frac{[p\rho]^{n_1}[(1-p)\rho]^{\frac{n_2-n_1}{2}}}{n_1! \frac{n_2-n_1}{2}!}$$

and S is the set of $(n_1,n_2)$ satisfying $n_1=0, 1, 2, s$; and $$n_2 = \begin{cases} n_1, n_1+2, \ldots, N-s & \text{if } n_1, N-s \text{ are of same parity} \\ n_1, n_1+2, \ldots, N-s-1 & \text{if } N-s+n_1 \text{ is odd} \end{cases}$$

wherein $\rho$=traffic load on the device in Erlangs.

13. A method of allocating ports in a communications device having N ports, wherein N is an integer number greater than 1, comprising:
   determining a load ratio "p" for the communications device;
   determining a blocking probability, $P_A$, associated with a first type load for the communications device, wherein the blocking probability associated with the first type load is a function of s, wherein s is a positive integer number; and
   determining a blocking probability, $P_T$, associated with a second type load for the communications device, wherein the blocking probability associated with the second type load is a function of s;
   determining a value "s" which results in a minimum value for the expression:
   $pP_A+(1-p)P_T$;
   allocating s ports of a first type; and
   allocating N−s ports of a second type.

14. The method of claim 13, wherein:
   determining the blocking probability $P_A$ associated with the first type load includes solving the equation: $P_A=E[\rho p,s]$;
   determining the blocking probability $P_T$ associated with the second type load includes solving the equation: $P_T=E[(1-p)\rho,\lfloor(N-2s)/2\rfloor]$, wherein
   $E[\alpha,n]=(\alpha^n/n!)/(\Sigma_{i=0}^{n}(\alpha^i)/i!)$, such that the terms a, n, and i are defined according to the Erlang-B formula;
   $\rho$=traffic load on the device in Erlangs.

15. The method of claim 13, wherein allocating s ports of a first type includes allocating a positive integer number that is less than half of the total ports N as ports of a first type.

16. The method of claim 15, wherein allocating ports of a second type includes:
   allocating s access load ports; and
   allocating N−s transit ports.

17. The method of claim 16, further comprising dynamically allocating ports of the second type between access load ports and transit ports.

18. The method of claim 17, further comprising dynamically allocating all of the ports of the second type as transit ports.

19. The method of claim 18, further comprising dynamically allocating no more than s ports of the second type as access load ports.

20. The method of claim 18, wherein
   determining the blocking probability $P_A$ associated with the first type load includes solving the equation:

$$P_A = \begin{cases} \sum_{n_2=s}^{2\lceil N/2 \rceil - s - 2} P(s, n_2) + \sum_{n_1=0}^{\lfloor s/2 \rfloor} P(2n_1, N-s) & \text{if } N-s \text{ is even} \\ \sum_{n_2=s}^{2\lceil N/2 \rceil - s - 2} P(s, n_2) + \sum_{n_1=1}^{\lceil s/2 \rceil} P(2n_1-1, N-s-1) & \text{if } N-s \text{ is odd} \end{cases}$$

determining the blocking probability $P_T$ associated with the second type load includes solving the equation:

$$P_T = \sum_{n_1=0}^{\lfloor s/2 \rfloor} P(2n_1, 2\lfloor(N-s)/2\rfloor) + \sum_{n_1=1}^{\lceil s/2 \rceil} P(2n_1-1, 2\lceil(N-s)/2\rceil - 1)$$

wherein:

$$P(n_1, n_2) = \frac{p(n_1, n_2)}{\sum_{(i,j) \in S} p(i,j)} \text{ for } (n_1, n_2) \in S$$

$$p(n_1, n_2) = \frac{[p\rho]^{n_1}[(1-p)\rho]^{\frac{n_2-n_1}{2}}}{n_1! \frac{n_2-n_1}{2}!}$$

and S is the set of $(n_1,n_2)$ satisfying $n_1=0, 1, 2, s$; and $$n_2 = \begin{cases} n_1, n_1+2, \ldots, N-s & \text{if } n_1, N-s \text{ are of same parity} \\ n_1, n_1+2, \ldots, N-s-1 & \text{if } N-s+n_1 \text{ is odd} \end{cases}$$

wherein $\rho$=traffic load on the device in Erlangs.

* * * * *

UNITED STATES PATENT AND TRADEMARK OFFICE
CERTIFICATE OF CORRECTION

PATENT NO. : 7,542,420 B1
APPLICATION NO. : 10/933549
DATED : June 2, 2009
INVENTOR(S) : Mokhtar et al.

It is certified that error appears in the above-identified patent and that said Letters Patent is hereby corrected as shown below:

Column 13, Claim 3, line 37 – delete part " $(\sum_{i=0}^{n}(a^{j})/i!)$ " and replace with -- $(\Sigma^{n}_{i=0}(a^{j})/i!)$ --

Column 13, Claim 9, lines 58-61, part of formula delete
"
$$P_A = \begin{cases} \sum_{n_2=s}^{2\lceil N/2 \rceil - s - 2} P(s, n_2) + \sum_{n_1=0}^{\lfloor s/2 \rfloor} P(2n_1, N-s) & \text{if } N-s \text{ is even} \\ \sum_{n_2=s}^{2\lceil N/2 \rceil - s - 2} P(s, n_2) + \sum_{n_1=1}^{\lfloor s/2 \rfloor} P(2n_1 - 1, N-s-1) & \text{if } N-s \text{ is odd} \end{cases}$$
"

and replace with
--
$$P_A = \begin{cases} \sum_{n_2=s}^{2\lceil N/2 \rceil - s - 2} P(s, n_2) + \sum_{n_1=0}^{\lfloor s/2 \rfloor} P(2n_1, N-s) & \text{if } N-s \text{ is even} \\ \sum_{n_2=s}^{2\lceil N/2 \rceil - s - 2} P(s, n_2) + \sum_{n_1=1}^{\lceil s/2 \rceil} P(2n_1 - 1, N-s-1) & \text{if } N-s \text{ is odd} \end{cases}$$
--

Column 14, Claim 11, line 44, delete " $(\sum_{i=0}^{n}(a^{j})/i!)$ " and replace with -- $(\Sigma^{n}_{i=0}(a^{j})/i!)$ --

UNITED STATES PATENT AND TRADEMARK OFFICE
CERTIFICATE OF CORRECTION

PATENT NO. : 7,542,420 B1
APPLICATION NO. : 10/933549
DATED : June 2, 2009
INVENTOR(S) : Mokhtar et al.

It is certified that error appears in the above-identified patent and that said Letters Patent is hereby corrected as shown below:

Column 14, Claim 12, lines 50-54, part of formula, delete
"
$$P_A = \begin{cases} \sum_{n_2=s}^{2\lfloor N/2 \rfloor-s-2} P(s, n_2) + \sum_{n_1=0}^{\lfloor s/2 \rfloor} P(2n_1, N-s) & \text{if } N-s \text{ is even} \\ \sum_{n_2=s}^{2\lfloor N/2 \rfloor-s-2} P(s, n_2) + \sum_{n_1=1}^{\lfloor s/2 \rfloor} P(2n_1-1, N-s-1) & \text{if } N-s \text{ is odd} \end{cases}$$
"

and replace with
--
$$P_A = \begin{cases} \sum_{n_2=s}^{2\lceil N/2 \rceil-s-2} P(s, n_2) + \sum_{n_1=0}^{\lfloor s/2 \rfloor} P(2n_1, N-s) & \text{if } N-s \text{ is even} \\ \sum_{n_2=s}^{2\lceil N/2 \rceil-s-2} P(s, n_2) + \sum_{n_1=1}^{\lceil s/2 \rceil} P(2n_1-1, N-s-1) & \text{if } N-s \text{ is odd} \end{cases}$$
--

Column 15, Claim 12, line 1, delete "-0, 1, 2, s;" and replace with -- - 0, 1, 2, ···, s; --

Column 15, Claim 14, line 37, delete " $(\Sigma_{i=0}^{n}(\alpha^j)/i!)$ " and replace with with -- $(\Sigma_{i=0}^{n}(\alpha^j)/i!)$ --

UNITED STATES PATENT AND TRADEMARK OFFICE
CERTIFICATE OF CORRECTION

PATENT NO. : 7,542,420 B1
APPLICATION NO. : 10/933549
DATED : June 2, 2009
INVENTOR(S) : Mokhtar et al.

It is certified that error appears in the above-identified patent and that said Letters Patent is hereby corrected as shown below:

Column 16, Claim 20, lines 15-19, delete

"
$$P_A = \begin{cases} \sum_{n_2=s}^{2\lfloor N/2 \rfloor - s - 2} P(s, n_2) + \sum_{n_1=0}^{\lfloor s/2 \rfloor} P(2n_1, N-s) & \text{if } N-s \text{ is even} \\ \sum_{n_2=s}^{2\lfloor N/2 \rfloor - s - 2} P(s, n_2) + \sum_{n_1=1}^{\lfloor s/2 \rfloor} P(2n_1 - 1, N-s-1) & \text{if } N-s \text{ is odd} \end{cases}$$
"

and replace with
--
$$P_A = \begin{cases} \sum_{n_2=s}^{2\lceil N/2 \rceil - s - 2} P(s, n_2) + \sum_{n_1=0}^{\lfloor s/2 \rfloor} P(2n_1, N-s) & \text{if } N-s \text{ is even} \\ \sum_{n_2=s}^{2\lceil N/2 \rceil - s - 2} P(s, n_2) + \sum_{n_1=1}^{\lceil s/2 \rceil} P(2n_1 - 1, N-s-1) & \text{if } N-s \text{ is odd} \end{cases}$$
--

Column 16, Claim 20, line 38, delete "-0, 1, 2, s;" and replace with -- - 0, 1, 2, ··· s; --

Signed and Sealed this

Fifteenth Day of December, 2009

David J. Kappos
*Director of the United States Patent and Trademark Office*